US012046200B2

(12) United States Patent
Shih et al.

(10) Patent No.: US 12,046,200 B2
(45) Date of Patent: Jul. 23, 2024

(54) ELECTRONIC DEVICE

(71) Applicant: Innolux Corporation, Miaoli County (TW)

(72) Inventors: Ming-Chia Shih, Miaoli County (TW); Ming-Chun Tseng, Miaoli County (TW)

(73) Assignee: Innolux Corporation, Miaoli County (TW)

(*) Notice: Subject to any disclaimer, the term of this patent is extended or adjusted under 35 U.S.C. 154(b) by 0 days.

(21) Appl. No.: 18/167,060

(22) Filed: Feb. 9, 2023

(65) Prior Publication Data

US 2023/0282167 A1 Sep. 7, 2023

Related U.S. Application Data

(60) Provisional application No. 63/316,419, filed on Mar. 4, 2022.

(30) Foreign Application Priority Data

Nov. 11, 2022 (CN) ......................... 202211410116.3

(51) Int. Cl.

| | |
|---|---|
| ***G09G 3/3258*** | (2016.01) |
| *G09G 3/20* | (2006.01) |
| *G09G 3/3233* | (2016.01) |

(52) U.S. Cl.

CPC ......... *G09G 3/3258* (2013.01); *G09G 3/2014* (2013.01); *G09G 3/2081* (2013.01); *G09G 3/3233* (2013.01); *G09G 2300/0852* (2013.01); *G09G 2300/0861* (2013.01); *G09G 2300/0895* (2013.01); *G09G 2310/08* (2013.01); *G09G 2320/02* (2013.01); *G09G 2320/0276* (2013.01); *G09G 2320/0626* (2013.01)

(58) Field of Classification Search

CPC ......... G09G 3/3258; G09G 2300/0852; G09G 2310/08; G09G 2320/02; G09G 2320/0626; G09G 3/2014; G09G 3/2081; G09G 3/3233; G09G 2300/0861; G09G 2300/0895; G09G 2320/0276

USPC .......................................................... 345/691

See application file for complete search history.

(56) References Cited

U.S. PATENT DOCUMENTS

| | | | | |
|---|---|---|---|---|
| 11,676,538 B2 * | 6/2023 | Hashimoto | G09G 3/2081 | 345/214 |
| 2001/0026261 A1 * | 10/2001 | Walker | G09G 3/3651 | 345/98 |
| 2002/0105506 A1 * | 8/2002 | Hiyama | H04N 19/103 | 375/E7.137 |
| 2007/0080905 A1 * | 4/2007 | Takahara | G09G 3/3258 | 345/76 |

(Continued)

*Primary Examiner* — Tom V Sheng

(74) *Attorney, Agent, or Firm* — JCIPRNET

(57) ABSTRACT

An electronic device including a light emitting unit and a voltage comparator is provided. The voltage comparator is coupled to the light emitting unit and configured to receive a first voltage and a second voltage. When the first voltage is greater than the second voltage, the voltage comparator outputs a comparison signal having a first voltage level to turn on the light emitting unit. When the first voltage is less than the second voltage, the voltage comparator outputs a comparison signal having a second voltage level to turn off the light emitting unit.

19 Claims, 4 Drawing Sheets

(56) References Cited

U.S. PATENT DOCUMENTS

| | | | | |
|---|---|---|---|---|
| 2011/0175895 | A1* | 7/2011 | Hayakawa | G09G 3/3655 345/212 |
| 2018/0025683 | A1* | 1/2018 | Oh | G09G 3/3233 345/690 |
| 2018/0224961 | A1* | 8/2018 | Yamamoto | G09G 3/36 |
| 2022/0036821 | A1* | 2/2022 | Cong | G09G 3/3233 |
| 2022/0101785 | A1* | 3/2022 | Chung | G09G 3/3233 |
| 2022/0330401 | A1* | 10/2022 | Hashimoto | H05B 45/39 |
| 2023/0043626 | A1* | 2/2023 | Cong | G09G 3/2081 |
| 2023/0104084 | A1* | 4/2023 | Yang | G09G 3/2014 345/691 |
| 2023/0120265 | A1* | 4/2023 | Hashimoto | G09G 3/2011 345/214 |

* cited by examiner

ELECTRONIC DEVICE

CROSS-REFERENCE TO RELATED APPLICATION

This application claims the priority benefits of U.S. provisional application Ser. No. 63/316,419, filed on Mar. 4, 2022, and China application serial no. 202211410116.3, filed on Nov. 11, 2022. The entirety of each patent application is hereby incorporated by reference herein and made a part of this specification.

BACKGROUND

Technical Field

The disclosure relates to a device, in particular to an electronic device having a light emitting unit.

Description of Related Art

At present, most of the traditional light emitting units used for display are driven by active-matrix (AM) pulse-amplitude modulation (PAM). Moreover, the traditional driving method usually has the problems of excessive data volume of display data, easy data loss in the process of adjusting the brightness, and water ripples in the image captured by the light emitting unit captured by the camera.

SUMMARY

This disclosure is directed to an electronic device and allows effective driving of a light emitting unit.

According to an embodiment of the disclosure, the electronic device includes a light emitting unit and a voltage comparator. The voltage comparator is coupled to the light emitting unit and configured to receive a first voltage and a second voltage. When the first voltage is greater than the second voltage, the voltage comparator outputs a comparison signal having a first voltage level to turn on the light emitting unit. When the first voltage is less than the second voltage, the voltage comparator outputs a comparison signal having a second voltage level to turn off the light emitting unit.

Based on the above, the electronic device of the disclosure may realize the driving of the light emitting unit of a random type active-matrix (AM).

The disclosure can be understood by referring to the following detailed description in conjunction with the accompanying drawings. It should be noted that for the reader's ease of understanding and for the sake of simplicity of the accompanying drawings, many of the accompanying drawings in this disclosure show only a portion of the apparatus, and specific components in the accompanying drawings are not drawn to actual scale. In addition, the number and dimensions of the components in the drawings are for illustrative purposes only and are not intended to limit the scope of this disclosure.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
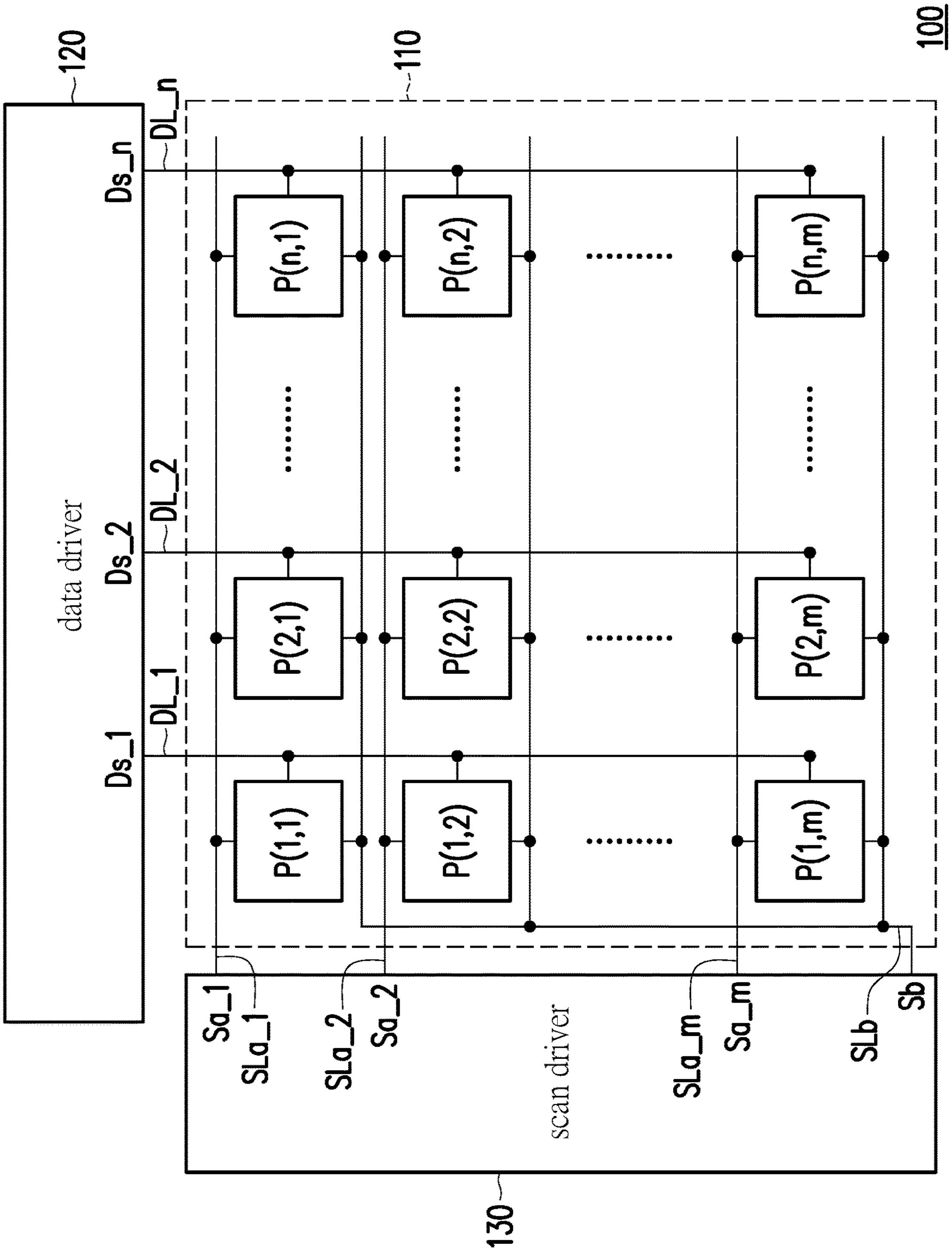
FIG. 1 is a schematic diagram of a circuit of an electronic device according to some embodiments of the disclosure.

Reference will now be made in detail to the exemplary embodiments of the disclosure, examples of which are illustrated in the accompanying drawings. Wherever possible, the same element symbols are used in the drawings and description to represent the same or similar parts.

The disclosure can be understood by referring to the following detailed description in conjunction with the accompanying drawings. It should be noted that for the reader's ease of understanding and for the sake of simplicity of the accompanying drawings, many of the accompanying drawings in this disclosure show only a portion of the electronoc device, and specific components in the accompanying drawings are not drawn to actual scale. In addition, the number and dimensions of the components in the drawings are for illustrative purposes only and are not intended to limit the scope of this disclosure.

Certain terms are used throughout this disclosure and in the claims to refer to specific elements. Those skilled in the art should understand that electronic device manufacturers may refer to the same components by different names. This document does not intend to distinguish between components that have the same function but different names. In the following description and claims, the terms "include" and "comprise" are open-ended terms and should therefore be interpreted to mean "includes but is not limited to . . . ".

In some embodiments of the disclosure, terms such as "couple", "interconnect", etc., unless specifically defined, may refer to two structures in direct contact, or may refer to two structures that are not in direct contact, where other structures are located between the two structures. The term "couple" also includes the case where both structures are movable, or where both structures are fixed. In addition, the term "couple" includes any direct and indirect electrical means of connection.

The use of sequential numbers such as "first", "second" and other words used to modify the components in the specification and claims does not in itself imply and represent that the components have any previous sequential numbers, nor does it represent the sequence of a component and another component, or the sequence of manufacturing methods. The use of multiple sequential numbers is only used to enable a component with a certain name and another component with the same name to make a clear distinction. The same words may not be used in the claim and the specification, whereby the first component in the specification may be the second component in the claim.

It should be noted that the following embodiments can substitute, reorganize, and mix technical features from several different embodiments to complete other embodiments without departing from the spirit of this disclosure.

The electronic device of the disclosure may include a display device, an antenna device, a sensing device, a touch display, a packaging device, a curved display or a free shape display, but not limited thereto. The electronic device can be a bendable or flexible electronic device. The antenna device may be, for example, a liquid crystal antenna or a variable capacitance antenna, but is not limited thereto. The antenna device may include, for example, an antenna splicing device, but is not limited thereto. The packaging device can be suitable for wafer-level package (WLP) technology or panel-level package (WLP) technology, such as chip first process or chip (RDL first) process packaging device. It should be noted that the electronic device can be any permutation and combination of the aforementioned, but not limited thereto. In addition, the shape of the electronic device can be rectangular, round, polygonal, with curved edges or other suitable shapes. The electronic device may include electronic elements. The electronic elements may include passive elements and active elements, such as capacitors, resistors, inductors, diodes, transistors, and the like. The diodes may include light emitting diodes or photodiodes. The light emitting diode may include, for example, an organic light emitting diode (OLED), a submillimeter light emitting diode (mini LED), a micro light emitting diode (micro LED) or a quantum dot light emitting diode (quantum dot LED), but not limited thereto. The electronic device may have a drive system, a control system, a light source system, . . . and other peripheral systems to support a display device, an antenna device, a wearable device (such as including augmented reality or virtual reality), a vehicle device (such as including a car windshield), or splicing device.

FIG. 1 is a schematic diagram of a circuit of an electronic device according to some embodiments of the disclosure. Referring to FIG. 1, an electronic device 100 includes a pixel array 110, a data driver 120, and a scan driver 130. The pixel array 110 includes multiple pixels P(1,1) to P(n,m), in which m and n are positive integers respectively. The data driver 120 is coupled to multiple pixels P(1,1) to P(n,m) in multiple columns of the pixel array 110 through multiple data signal lines DL_1 to DL_n. The scan driver 130 is coupled to multiple pixels P(1,1) to P(n,m) of multiple rows of the pixel array 110 through multiple first scanning signal lines SLa_1 to SLa_m and second scanning signal lines SLb.

In this embodiment, the data driver 120 may provide data signals Ds_1 to Ds_n of a first voltage and a second voltage to the data signal lines DL_1 to DL_n in a time-sharing manner. The scan driver 130 may provide first scan signals Sa_1 to Sa_m to the first scanning signal lines SLa_1 to SLa_m, and provide a second scan signal Sb to multiple second scanning signal lines SLb. In this embodiment, each row of the pixels P(1,1) to P(n,m) may be turned on at different times according to the first scan signals Sal to Sam to obtain the data signals Ds_1 to Ds_n having the first voltage at different times, respectively, where the each row of the pixels P(1,1) to P(n,m) may obtain data signals having the same or different first voltages. In this embodiment, the each row of the pixels P(1,1) to P(n,m) may be turned on at the same time according to the second scan signal Sb to obtain the data signal having the second voltage at the same time.

Figure 2:
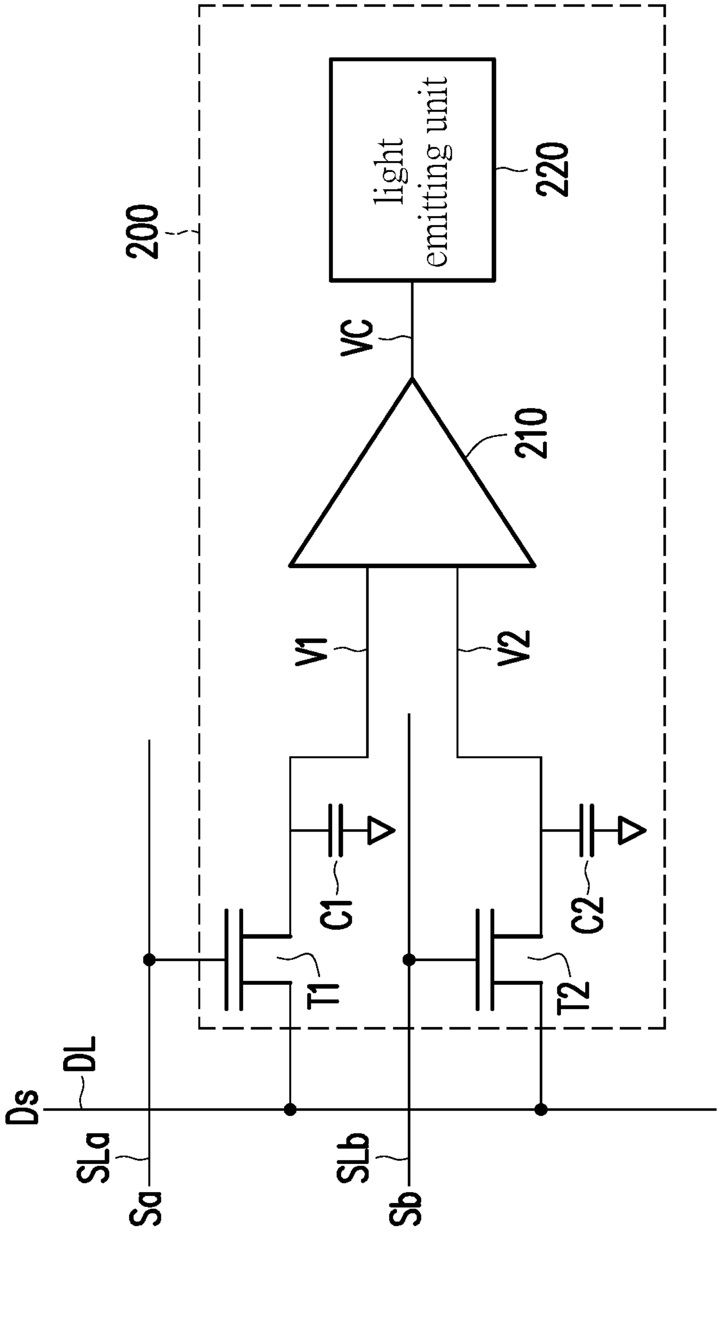
FIG. 2 is a schematic diagram of a pixel circuit of a pixel according to some embodiments of the disclosure.

FIG. 2 is a schematic diagram of a pixel circuit of a pixel according to some embodiments of the disclosure. Referring to FIG. 2, each of the pixels P(1,1) to P(n,m) in the embodiment of FIG. 1 may realize the pixel circuit structure shown in FIG. 2. In this embodiment, a pixel 200 includes a voltage comparator 210, a light emitting unit 220, a first scanning transistor T1, a second scanning transistor T2, and storage capacitors C1 and C2. An output terminal of the voltage comparator 210 is coupled to the light emitting unit 220. A first terminal of the first scanning transistor T1 is coupled to a data signal line DL. A second terminal of the first scanning transistor T1 is coupled to a first input terminal of the voltage comparator 210. A control terminal of the first scanning transistor T1 is coupled to the first scan signal line SLa. A first terminal of the second scanning transistor T2 is coupled to the data signal line DL. A second terminal of the second scanning transistor T2 is coupled to a second input terminal of the voltage comparator 210. A control terminal of the second scanning transistor T2 is coupled to the second scanning signal line SLb. A first terminal of the storage capacitor C1 is coupled to the second terminal of the scanning transistor T1. A second terminal of the storage capacitor C1 is coupled to a ground voltage. A first terminal of the storage capacitor C2 is coupled to the second terminal of the second scanning transistor T2. A second terminal of the storage capacitor C2 is coupled to the ground voltage. In this embodiment, the first scanning transistor T1 and the second scanning transistor T2 may be N-type transistors (e.g., N-metal-oxide-semiconductor (NMOS) transistors), but the disclosure is not limited thereto.

In this embodiment, when the first scanning transistor T1 is turned on according to a first scan signal Sa provided by a first scanning signal line SLa, the data signal line DL may provide a data signal Ds having a first voltage V1 to the first terminal of the scanning transistor T1 to store the first voltage V1 to the storage capacitor C1 through the scanning transistor T1. Then, when the scanning transistor T2 is turned on according to the second scan signal Sb provided by the second scanning signal line SLb, the data signal line DL may provide a data signal Ds having a second voltage V2 to the first terminal of the scanning transistor T2 to store the second voltage V2 to the storage capacitor C2 through the scanning transistor T2.

In this embodiment, a first terminal and a second terminal of the voltage comparator 210 may receive the first voltage V1 and the second voltage V2 respectively. When a voltage value of the first voltage V1 is greater than a voltage value of the second voltage V2, the voltage comparator 210 outputs a comparison signal VC having a first voltage level (e.g., a high voltage level to turn on the light emitting unit 220. When the voltage value of the first voltage V1 is less than the voltage value of the second voltage V2, the voltage comparator 210 outputs a comparison signal VC having a second voltage level (e.g., a low voltage level) to turn off the light emitting unit 220. In this embodiment, the first scanning transistor T1 may be turned on during a first period to provide the first voltage V1 to the first input terminal of the voltage comparator 210, and the second scanning transistor T2 may be turned on during a second period to provide the second voltage V2 to the second input terminal of the voltage comparator 210, in which the first period does not overlap with the second period. In some embodiments, the first scanning transistor T1 may be turned on during the first period to provide the first voltage V1 to the first input terminal of the voltage comparator 210, and the second scanning transistor T2 may be turned on during the second period to provide the second voltage V2 to the second input terminal of the voltage comparator 210, in which the first period and the second period may overlap, but this disclosure is not limited thereto.

In this embodiment, the data driver (e.g., the data driver 120 in FIG. 1) may provide the data signal Ds having the first voltage V1 to the pixel 200 according to display data, and may randomly provide the data signal Ds having the second voltage V2 to the pixel 200. For example, the voltage values of both the first voltage V1 and the second voltage V2 may be between 0 volts and 10 volts. However, the voltage value of the first voltage V1 may be, for example, a fixed voltage value (e.g., 5 volts) determined according to the display data of a current frame, while the voltage value of the second voltage V2 may be randomly selected from a random value between 0 volts and 10 volts. In this regard, whether the light emitting unit 220 is turned on or turned off is determined according to the voltage value of the second voltage V2. In this embodiment, the data driver may update the first voltage V1 of the data signal Ds frame by frame, and the data driver may update the second voltage V2 of the data signal Ds with a vertical clock (V clock) signal of a panel, in which the vertical clock signal may be switched multiple times from frame to frame. That is, the comparison signal VC output by the voltage comparator 210 may change with the voltage value of the second voltage V2, while dynamically turning on or off the light emitting unit 220. Therefore, a (luminous) brightness ratio of the light emitting unit 220 in one frame may be in accordance with the following formula (1). In the following formula (1), B % may be the brightness ratio, L_on may be a number of times the light emitting unit 220 is turned on during a period of a frame, L_off may be a number of times the light emitting unit 220 is turned off during a period of a frame, and DR % may be a duty ratio of the vertical clock signal.

$$B\% = \left[\frac{\text{L\_on}}{\text{L\_on} + \text{L\_off}}\right] \times DR\% \qquad \text{Formula (1)}$$

In some embodiments, the DR % may also be generated according to a horizontal synchronization (Hsync) signal and/or a vertical synchronization (Vsync) signal. The horizontal synchronization signal and the vertical synchronization signal (which may be used, for example, to determine switching frequency between frames) may be in accordance with the following relation, and the frequency of the horizontal synchronization signal may be higher than the frequency of the vertical synchronization signal from the following relation.

(relation): $H\text{sync}=V\text{sync}\times N$ (i.e., a number of times a frame can be re-cut from frame to frame)

Figure 3:
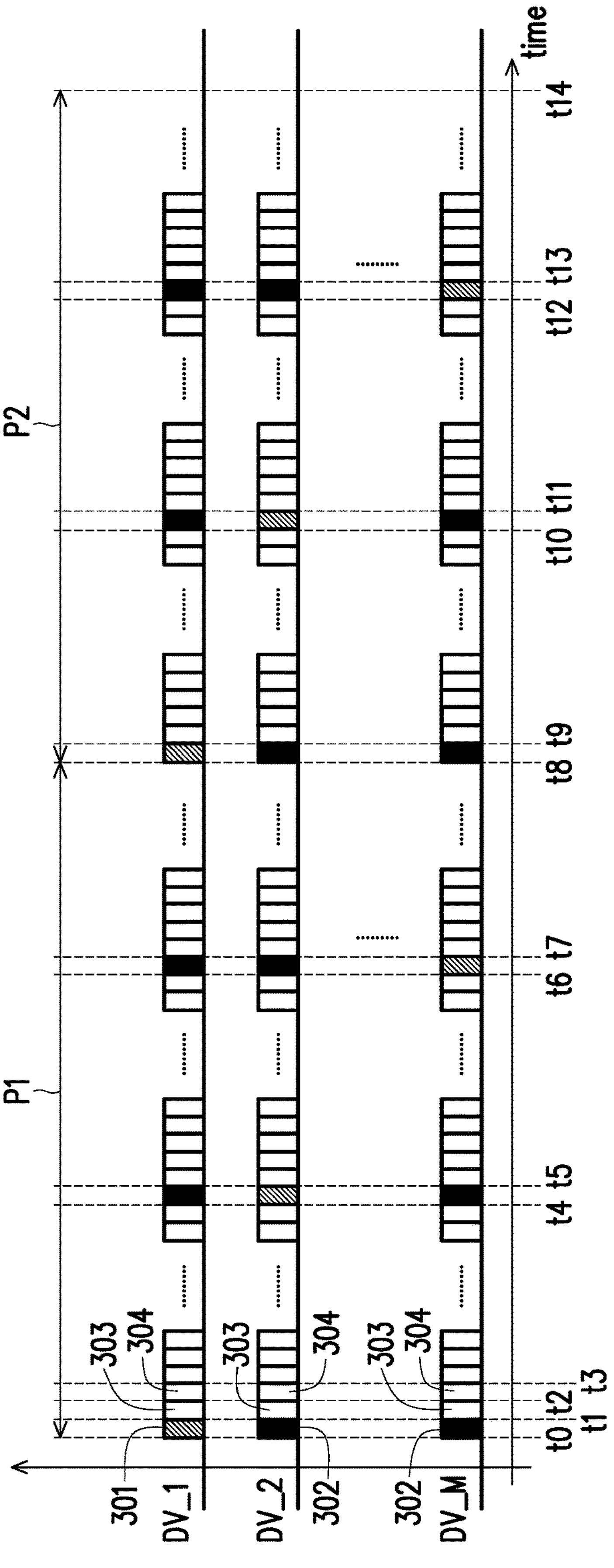
FIG. 3 is a driving sequential diagram of an electronic device according to some embodiments of the disclosure.

FIG. 3 is a driving sequential diagram of an electronic device according to some embodiments of the disclosure. Referring to FIG. 1 and FIG. 3, a driving sequence of the pixels P(1,1) to P(n,m) may be shown in FIG. 3. In this embodiment, a driving sequence DV_1 may write results corresponding to voltages of the pixels P(1,1) to P(n,1). A driving sequence DV_2 may write results corresponding to voltages of pixels P(1,2) to P(n,2). By analogy, a driving sequence DV_M may write results corresponding to voltages of pixels P(1,M) to P(n,M). In this embodiment, a period from time t0 to time t8 may be a first frame period P1, and a period from time t9 to time t14 may be a second frame period P2.

For the first frame period P1, during a period from time t0 to time t1, the first scan signal Sa_1 may be, for example, at a high voltage level to turn on a first transistor of the pixels P(1,1) to P(n,1). The data signal lines DL_1 to DL_n may provide the data signals Ds_1 to Ds_n of the first voltage having the same or different voltage values according to the light-emitting demand of the current frame (or based on display data). Thus, corresponding to a block 301, the pixels P(1,1) to P(n, 1) may be written (or updated) with a first voltage having a new voltage value during the period from time t0 to time t1. Moreover, during the period from time t0 to time t1, the first scan signals Sa_2 to Sa_m may be, for example, at a low voltage level to turn off the first transistor of the pixels P(1,2) to P(n,M). Thus, corresponding to a block 302, pixels P(1,2) to P(1,m) may not be written (or not updated) with a first voltage having a new voltage value during the period from time t0 to time t1. In addition, the second scan signal Sb may be at a low voltage level during the period from time t0 to time t1 to turn off a second transistor of the pixels P(1,1) to P(n,m).

During a period from time t1 to time t2, corresponding to a periodic switch of the vertical clock signal, the second scan signal Sb may be, for example, at a high voltage level to turn on the second transistor of the pixels P(1,1) to P(n,m), and the data signal lines DL_1 to DL_n may synchronously provide the data signals Ds_1 to Ds_n having the second voltage. Thus, corresponding to a block 303, the pixels P(1,1) to P(n,m) may be synchronously written with a second voltage having a new voltage value (a random value) during the period from time t1 to time t2. In this way, the respective voltage comparators of the pixels P(1,1) to P(n,m) may be turned on or off according to respective currently stored voltage values of the first voltage and the second voltage.

During a period from time t2 to time t3, corresponding to a next periodic switch of the vertical clock signal, the second scan signal Sb may be, for example, at a high voltage level to turn on the second transistor of the pixels P(1,1) to P(n,m), and the data signal lines DL_1 to DL_n may synchronously provide the data signals Ds_1 to Ds_n having another second voltage. Thus, corresponding to a block 304, the pixels P(1,1) to P(n,m) may be synchronously written with another second voltage having another new voltage value (another random value) during the period from time t2 to time t3. In this way, the respective voltage comparators of the pixels P(1,1) to P(n,m) may be turned on or off according to respective currently stored voltage values of the first voltage and the another second voltage. In other words, in this embodiment, the voltage values of the second voltage respectively stored in the pixels P(1,1) to P(n,m) are updated with the vertical clock signal.

During a period from time t4 to time t5, the first scan signal Sa_2 may, for example, be at a high voltage level to turn on a first transistor of the pixels P(1,2) to P(n,2). The data signal lines DL_1 to DL_n may provide the data signals Ds_1 to Ds_n of the first voltage having the same or different voltage values according to the light-emitting demand of the current frame (or based on display data). Thus, the pixels P(1,2) to P(n,2) may be written (or updated) with a first voltage having a new voltage value during the period from time t4 to time t5. Moreover, during the period from time t4 to time t5, the first scan signals Sal and Sa 3 to Sa_m may be, for example, at a low voltage level to turn off first transistors of the pixels P(1,1) to P(n,1) and P(1,3) to P(n,M). Thus, the pixels P(1,2) to P(1,m) may not be written (or not updated) with the first voltage during the period from time t4 to time t5. In addition, the second scan signal Sb may be at a low voltage level during the period from time t4 to time t5 to turn off the second transistor of the pixels P(1,1) to P(n,m). By analogy, the pixels P(1,m) to P(n,m) may be written (or updated) with a first voltage having a new voltage value during a period from time t6 to time t7. Thus, the voltage value of the first voltage stored in the each row of the pixels P(1,1) to P(n,m) may be sequentially updated according to the light-emitting demand of the current frame (or based on display data).

Similarly, for the second frame period P2, the pixels P(1,1) to P(n,1) may be written (or updated) with a next first voltage having another new voltage value during a period from time t8 to time t9. The pixels P(1,2) to P(n,2) may be written (or updated) with a next first voltage having another new voltage value during a period from time t10 to time t11. The pixels P(1,m) to P(n,m) may be written (or updated) with a next first voltage having another new voltage value during a period from time t12 to time t13. In other words, in this embodiment, the voltage value of the first voltage respectively stored in the pixels P(1,1) to P(n,m) are updated frame by frame.

Therefore, the pixels P(1,1) to P(n,m) in this embodiment may be randomly illuminated during a frame (or even during the whole illumination process), and an effect of random illumination in time and space may be achieved, which may effectively overcome a problem of water ripples in the image captured by a light emitting unit captured by a camera. In addition, for example, assuming that a relationship curve of the voltage (e.g., an X-axis may be a scale value of the voltage, a brightness ratio, or a gray scale value, etc., and a Y-axis may be a voltage value) is linear, if the pixel P(1,1) is to display a result of 100% brightness (i.e., to present the highest brightness) during the first frame period P1, the voltage value of the first voltage V1 obtained by the pixel P(1,1) during the first frame period P1 may be, for example, 10 volts (the voltage value of the first voltage V1 may be between 0 volts and 10 volts). Therefore, regardless of the voltage value of the second voltage V2 obtained by the pixel P(1,1) during the first frame period P1 (the voltage value of the second voltage V2 may be randomly selected from 0 volts to 10 volts), the pixel P(1,1) is turned on during the first frame period P1, and the result of displaying 100% brightness (i.e., presenting the highest brightness) may be achieved. For another example, if the pixel P(1,1) is to display 50% brightness (i.e., to present half brightness) during the second frame period P2, the voltage value of the first voltage V1 obtained by the pixel P(1,1) during the second frame period P2 may be, for example, 5 volts (the voltage value of the first voltage V1 may be between 0 volts and 10 volts). Since a chance that the voltage value of the second voltage V2 obtained by the pixel P(1,1) during the second frame period P2 is higher than the voltage value of the first voltage V1 is 50% (i.e., there may be fifty times that the voltage value of the second voltage V2 randomly selected during one hundred random variations is higher than the voltage value of the first voltage V1), based on formula (1) above, the pixel P(1,1) may achieve a result of displaying 50% brightness during the second frame period P2 (i.e., presenting half brightness). In some embodiments, the relationship curve of the voltage (e.g., an X-axis may be a scale value of the voltage, a brightness ratio, or a gray scale value, etc., and a Y-axis may be a voltage value) may also be non-linear, and the disclosure is not limited thereto.

Figure 4:
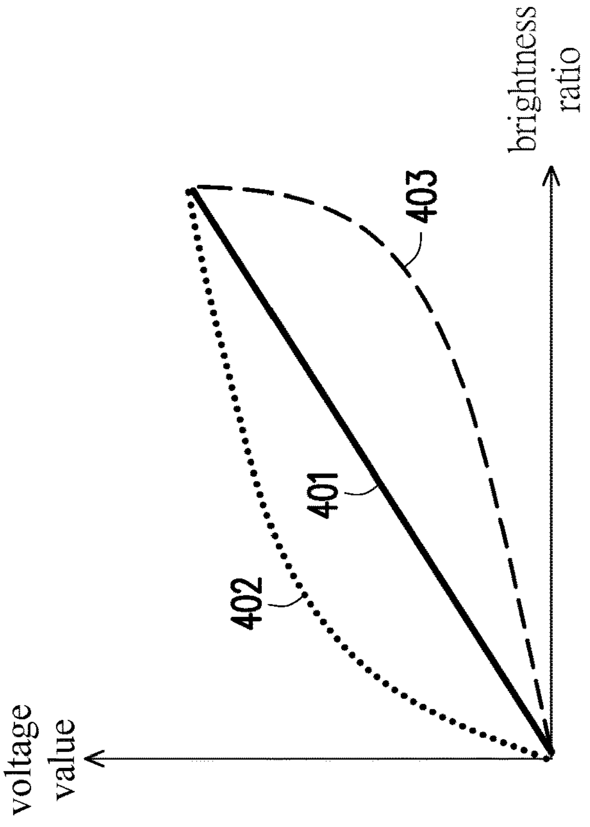
FIG. 4 is a schematic diagram of voltage value-brightness ratio relationship curves according to some embodiments of the disclosure.

FIG. 4 is a schematic diagram of voltage value-brightness ratio relationship curves according to some embodiments of the disclosure. Referring to FIG. 4, the first voltage and the second voltage according to the embodiments of the disclosure may be generated by the data driver based on the display data and a linear voltage value-brightness ratio relationship curve 401, a decreasing non-linear voltage value-brightness ratio relationship curve 402, or an increasing non-linear voltage value-brightness ratio relationship curve 403 as shown in FIG. 4. Curvature of the non-linear curve may be determined based on internal resistance of the voltage comparator. The linear voltage value-brightness ratio relationship curve 401, the decreasing non-linear voltage value-brightness ratio relationship curve 402, or the increasing non-linear voltage value-brightness ratio relationship curve 403 are relationship between the brightness ratio and the voltage value of the display data. For example, the data driver may determine a corresponding voltage value as the first voltage according to a brightness ratio (or grayscale value) corresponding to a certain pixel in a current image data. Therefore, the electronic device of the disclosure does not require an operation of tying a gamma curve to a driving voltage of the light emitting unit to achieve effective light emitting (or display) driving.

Figure 5:
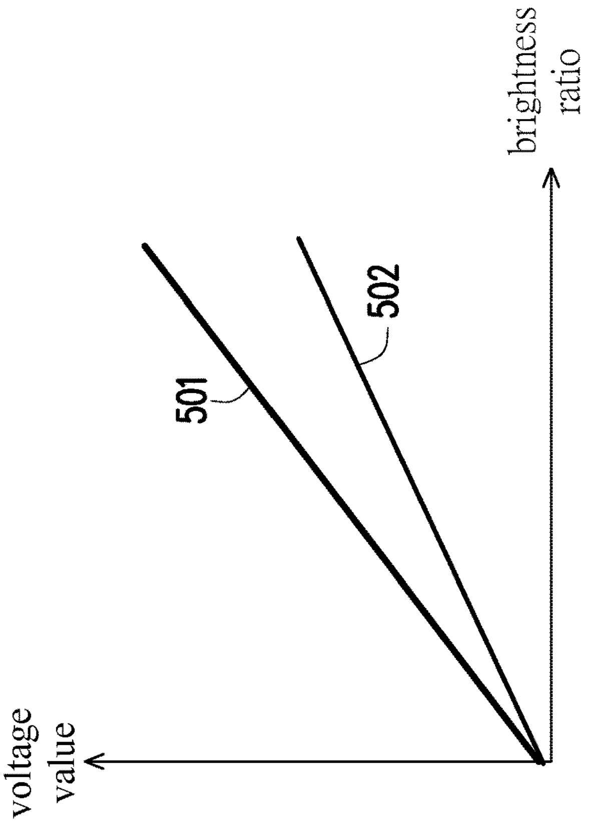
FIG. 5 is a schematic diagram of voltage value-brightness ratio relationship curves according to some embodiments of the disclosure.

FIG. 5 is a schematic diagram of voltage value-brightness ratio relationship curves according to some embodiments of the disclosure. Referring to FIG. 5, in some embodiments, the electronic device according to the embodiments of the disclosure may, for example, adjust the brightness of the light emitting unit by means of a digital setting in the process of brightness adjustment. In this regard, the data driver may, for example, determine the voltage values of the first voltage and the second voltage according to a same voltage value-brightness ratio relationship curve 501, but brightness ratios (or grayscale values) corresponding to the voltage values of the first voltage and the second voltage are different.

Alternatively, in some other embodiments, the electronic device according to the embodiments of the disclosure may, for example, adjust the brightness of the light emitting unit by means of an analogous setting in the process of brightness adjustment. In this regard, the data driver may, for example, determine the first voltage according to the voltage value-brightness ratio relationship curve 501, and determine the voltage value of the second voltage according to a voltage value-brightness ratio relationship curve 502, and the voltage value of the first voltage is equal to the voltage value of the second voltage multiplied by a certain attenuation factor (e.g. 0.7). In other words, the first voltage and the second voltage may be generated according to different voltage value-brightness ratio relationship curves.

Alternatively, in some other embodiments, the electronic device according to the embodiments of the disclosure may, for example, adjust the brightness of the light emitting unit by adjusting the duty ratio of the vertical clock signal in the process of brightness adjustment. In this regard, as in formula (1) above, the brightness ratio of the light emitting unit is proportional to the duty ratio DR % of the vertical clock signal. Thus, the data driver may adjust the brightness of the light emitting unit by changing the duty ratio DR % of the vertical clock signal.

It should be noted that, in other embodiments of the disclosure, each of the relationship curves shown in FIG. 4 and FIG. 5 may also be represented as a voltage value-gray scale value relationship curve or other form of gamma curve, respectively.

To sum up, the electronic device of the disclosure may set a voltage comparator in each of the pixels, and provide a first voltage and a second voltage to the voltage comparator, in which the first voltage has a fixed value in one frame and the second voltage that changes with the vertical clock signal and is a random value, and may dynamically turn on or off the light emitting unit in one frame, enabling the driving of the light emitting unit of active matrix pulse width modulation.

Finally, it should be noted that the above embodiments are used only to illustrate the technical solutions of the disclosure, but not to limit them; although the disclosure has been described in detail with reference to the foregoing embodiments, it should be understood by anyone having ordinary knowledge in the art that it is still possible to modify the technical solutions described in the foregoing embodiments or to replace some or all of the technical features thereof with equivalent ones, and that such modifications or replacements do not take the nature of the corresponding technical solutions out of the scope of the technical solutions of the foregoing embodiments of the disclosure.

What is claimed is:

1. An electronic device comprising:

a light emitting unit; and a voltage comparator coupled to the light emitting unit, and configured to receive a first voltage and a second voltage, wherein when the first voltage is greater than the second voltage, the voltage comparator outputs a comparison signal having a first voltage level to turn on the light emitting unit, wherein when the first voltage is less than the second voltage, the voltage comparator outputs a comparison signal having a second voltage level to turn off the light emitting unit, wherein the first voltage is updated frame by frame, and the second voltage is updated with a vertical clock signal.

2. The electronic device according to claim 1, wherein a voltage value of the second voltage is a random value.

3. The electronic device according to claim 1, wherein whether the light emitting unit is turned on or turned off is determined according to a voltage value of the second voltage.

4. The electronic device according to claim 1, wherein a brightness ratio of the light emitting unit is in accordance with the following formula:

$$B\ \% = \left[\frac{\text{L\_on}}{\text{L\_on} + \text{L\_off}}\right] \times DR\ \%$$

where B % is the brightness ratio, L_on is a number of times the light emitting unit is turned on during a period of a frame, L_off is a number of times the light emitting unit is turned off during a period of a frame, and DR % is a duty ratio of the vertical clock signal.

5. The electronic device according to claim 1 further comprising:

a plurality of pixels, wherein each of the pixels comprises the light emitting unit and the voltage comparator, wherein the pixels receive the second voltage through a data signal line.

6. The electronic device according to claim 5, wherein the each of the pixels further comprises:

a first scanning transistor, wherein a control terminal of the first scanning transistor is coupled to a first scanning signal line, a first terminal of the first scanning transistor is coupled to the data signal line, and a second terminal of the first scanning transistor is coupled to a first input terminal of the voltage comparator; and a second scanning transistor, wherein a control terminal of the second scanning transistor is coupled to a second scanning signal line, a first terminal of the second scanning transistor is coupled to the data signal line, and a second terminal of the second scanning transistor is coupled to a second input terminal of the voltage comparator.

7. The electronic device according to claim 6, wherein the first scanning transistor is turned on during a first period to provide the first voltage to the first input terminal of the voltage comparator, and the second scanning transistor is turned on during a second period to provide the second voltage to the second input terminal of the voltage comparator, wherein the first period does not overlap with the second period.

8. The electronic device according to claim 6, wherein the each of the pixels further comprises:

a first storage capacitor coupled to the first scanning transistor; and a second storage capacitor coupled to the second scanning transistor.

9. The electronic device according to claim 6, wherein the first scanning transistor and the second scanning transistor are N-type transistors respectively.

10. The electronic device according to claim 6, wherein each row of the pixels respectively obtains a data signal having the first voltage at different times according to the first scanning signal.

11. The electronic device according to claim 6, wherein each row of the pixels respectively obtains a data signal having the second voltage at the same time according to the second scanning signal.

12. The electronic device according to claim 1, wherein the first voltage and the second voltage are generated according to different voltage relationship curves.

13. The electronic device according to claim 12, wherein each one of the different voltage relationship curves is linear.

14. The electronic device according to claim 12, wherein each one of the different voltage relationship curves is non-linear.

15. The electronic device according to claim 12, wherein each one of the different voltage relationship curves is a voltage value-brightness ratio relationship curve.

16. The electronic device according to claim 1, wherein brightness of the light emitting unit is proportional to a duty ratio of the vertical clock signal.

17. The electronic device according to claim 1, wherein the comparison signal changes with a voltage value of the second voltage.

18. The electronic device according to claim 1, wherein the first voltage level is higher than the second voltage level.

19. The electronic device according to claim 1, wherein a voltage value of the first voltage is a fixed voltage value determined according to display data of a current frame.

* * * * *